United States Patent [19]

Ishibashi

[11] Patent Number: 4,938,318
[45] Date of Patent: Jul. 3, 1990

[54] ADJUSTABLE SHOE MOUNTING STRUCTURE FOR BICYCLE BRAKE ASSEMBLY

[75] Inventor: Yasunori Ishibashi, Osaka, Japan
[73] Assignee: Maeda Industries, Ltd., Osaka, Japan
[21] Appl. No.: 388,007
[22] Filed: Aug. 2, 1989
[30] Foreign Application Priority Data
  Aug. 9, 1988 [JP] Japan .............................. 63-105772[U]
[51] Int. Cl.$^5$ ................................................ B62L 1/16
[52] U.S. Cl. .............................. 188/24.19; 188/196 M
[58] Field of Search ............... 188/24.11, 24.12, 24.19, 188/24.22, 71.7, 196 M, 236

[56] References Cited
U.S. PATENT DOCUMENTS
  4,546,858 10/1985 Nagano .............................. 188/24.19
  4,768,623 9/1988 Nagano .............................. 188/24.12

FOREIGN PATENT DOCUMENTS
  55-47740 11/1980 Japan .
  2088976 6/1982 United Kingdom ............. 188/24.19

Primary Examiner—Duane A. Reger
Attorney, Agent, or Firm—William H. Eilberg

[57] ABSTRACT

The present invention provides an adjustable shoe mounting structure for a bicycle brake assembly. The mounting structure includes a support bolt inserted into a reception bore of each brake arm and having one projecting end screwed to a nut. The support bolt further has a head formed with a cross bore extending transversely of the bolt. Each brake shoe has a mounting pin inserted into the cross bore of the bolt. A pin retainer is fitted on the bolt head, and has a pair of pin retaining holes for press-fitting engagement with the mounting pin to restrain the movement thereof relative to the cross bore upon loosening of the nut.

11 Claims, 4 Drawing Sheets

ADJUSTABLE SHOE MOUNTING STRUCTURE FOR BICYCLE BRAKE ASSEMBLY

BACKGROUND OF THE INVENTION

1. Field of the Invention:

This invention relates generally to bicycle brake assemblies. It more particularly relates to an adjustable shoe mounting structure for a bicycle brake assembly.

2. Description of the Prior Art:

As is well known, most commonly used for bicycles available in the market are so-called caliper brakes. This type of brake includes a pair of brake arms or calipers pivotally supported on the bicycle frame (front fork or rear fork) to be positioned on both sides of a wheel, each caliper being provided at its lower end with a brake shoe in facing relation to the wheel rim. Upon actuation of a remote brake lever, the calipers are pivoted in a braking direction, so that the brake shoes come into braking contact with the rim.

Obviously, when brake shoes are positioned or oriented improperly relative to a wheel rim, it becomes difficult to obtain a good braking performance, which may put the rider in danger during cycling. However, there are various types of bicycles which may differ from each other in various points such as brake mounting position, and front or rear fork inclination. Thus, when using the same type of brakes for different types of bicycles, it is necessary to properly adjust the shoe position and/or orientation relative to the wheel rim depending on the particular bicycle type. Further, even in the case of a single bicycle, it is periodically necessary to readjust the shoe position to compensate for shoe abrasion after repeated use of the brake.

In view of such a requirement, it is quite common to mount brake shoes by means of adjustable mounting structures.

A typical shoe mounting structure for a prior art brake comprises a bolt reception bore penetrating through a shoe support portion of a brake arm lengthwise of the bicycle, and a support bolt loosely inserted through the bolt reception bore. The support bolt has a threaded end projecting from one end of the bolt reception bore for engagement with a nut, and an enlarged end or head projecting from the other end of the bore. The bolt head is formed with a cross bore extending transversely of the bolt. The brake shoe has a mounting pin inserted into the bolt cross bore.

With the shoe mounting structure described above, when the nut is tightened up, the mounting pin of the brake shoe is pressed transversely against the bolt cross bore, thereby fixing the shoe relative to the brake arm. On the other hand, when the nut is loosened, the support bolt and the shoe mounting pin become loose for adjusting movement or rotation. For example, the shoe mounting pin may be slidably moved relative to the bolt cross bore for horizontal adjustment toward or away from the wheel rim, the mounting pin being further rotatable within the bolt cross bore for orientation adjustment. Moreover, the support bolt may be rotated within the bolt reception bore for second orientation adjustment. If necessary, the bolt reception bore may be elongated vertically in cross-section to provide vertical adjustment of the shoe position.

In this way, the prior art shoe mounting structure provides at least three degrees, preferably four or more degrees, of adjusting freedom. Thus, by utilizing such diversity in the adjusting freedom, it is possible to bring the shoe to an optimum position (orientation) relative to the wheel rim in each particular type of bicycle.

However, such diversity in the adjusting freedom can often result in difficulty of adjusting operation. In fact, it is not always necessary to adjust the shoe position in every direction or degree of adjusting freedom. For example, if the horizontal position and angular orientation of the shoe are already proper, only the vertical position of the shoe need be adjusted by vertically moving the support bolt within the vertically elongated reception bore. Nevertheless, both of the support bolt and the shoe mounting pin inevitably become loose upon slackening the nut, which may cause unexpected movement and/or rotation of the shoe mounting pin to come out of previously proper position and/or orientation. In an extreme case, it may become necessary to readjust the shoe position and/or orientation in every degree of the adjusting freedom from the very start.

Thus, according to the prior art shoe mounting structure, the diversity in the adjusting freedom, though enabling a wide range of adjustment, can often give rise to a problem of making the adjusting operation troublesome and time-taking.

In view of the above disadvantage of the typical prior art shoe mounting structure, Japanese Utility Model Publication No. 55-47740 (Published: Nov. 8, 1980; Application No.: 51-161890; Filed: Dec. 2, 1976; Inventor: Yohsuke FUKUI; Applicant: Shimano Industrial Co., Ltd.) proposes an improvement in a shoe mounting structure which is similar in basic arrangement to the typical prior art discussed above. Specifically, the improvement comprises a cam plate mounted on the support bolt and interposed between the shoe support portion of a brake arm and the mounting pin of the brake shoe. The cam plate is urged into pressing contact with the shoe mounting pin by a compression coil spring which is accommodated in a recess of the shoe support portion.

According to the arrangement proposed by the Japanese utility model publication, the compression spring urges the cam plate in pressing contact with the shoe mounting pin even upon loosening the nut for positional adjustment. As a result, the shoe mounting pin is always pressed transversely against the cross bore of the support bolt, thereby frictionally restraining the movement of the shoe mounting pin relative to the support bolt during positional adjustment of the brake shoe. On the other hand, the shoe mounting pin may be forcibly moved and/or rotated within the cross bore of the support bolt if a sufficient manual force is applied to overcome the friction imparted by the compression spring. Thus, it is possible to facilitate the adjusting operation while enjoying the benefits of the diverse adjusting freedom.

However, the cam plate of the above Japanese utility model is pressed against the shoe mounting pin merely by the urging force of the compression spring. Therefore, the cam plate may move away from the shoe mounting pin if an operator's finger accidentally comes into contact with the cam plate during the adjusting operation, thereby bringing the shoe mounting pin into its loose state relative to the support cross bore. This state gives rise to the same problem as already described in connection with the typical prior art.

SUMMARY OF THE INVENTION

It is, therefore, an object of the present invention is to provide an adjustable shoe mounting structure which facilitates the adjusting operation while ensuring a wide range of adjustment.

Another object of the invention is to further expand the freedom in adjusting the position or orientation of the brake shoe.

A further object of the invention is to ensure reliable fixation of the brake shoe after positional adjustment.

According to the present invention, there is provided an adjustable shoe mounting structure for a bicycle brake assembly comprising: a bolt reception bore penetrating through a shoe support portion of the brake assembly; a support bolt loosely insertable into the reception bore, one end of the support bolt being threaded and projectable from one end of the reception bore, the other end of the support bolt being projectable from the other end of the reception bore and formed with a cross bore extending transversely of the support bolt; a shoe mounting pin extending from a brake shoe for insertion into the cross bore of the support bolt; a nut engageable with the threaded end of the support bolt for transversely pressing the shoe mounting pin against the cross bore of the support bolt upon tightening of the nut to fix the brake shoe relative to the shoe support portion; and a pin retainer mounted to the other end of the support bolt and having at least one pin retaining hole in alignment with the cross bore for press-fitting to the shoe mounting pin to frictionally restrain the shoe mounting pin from moving relative to the cross bore.

According to the arrangement described above, the pin retainer directly holds the shoe mounting pin at the pin retaining hole. Thus, the pin retainer is virtually inseparable from the shoe mounting pin, and reliably restrains it from unexpectedly moving relative to the cross bore of the support bolt, thereby facilitating the shoe adjusting operation.

On the other hand, the shoe mounting pin may be forcibly moved relative to the cross bore of the support bolt with a manual force enough to overcome the friction between the pin retaining hole and the shoe mounting pin. Thus, the diversity in the adjusting freedom of the brake shoe is still maintained.

Preferably, the pin retainer may be formed with a pair of pin retaining holes both of which come into frictional or press-fitting engagement with the mounting pin. Further, the support bolt, which is inherently rotatable about its own axis for orientation adjustment of the brake shoe, may be made to have two additional degrees of moving freedom to further expand the adjusting freedom for the brake shoe.

Other objects, features and advantages of the present invention will be fully understood from the following detailed description of the preferred embodiment given with reference to the accompanying drawings.

DETAILED DESCRIPTION

Figure 1:
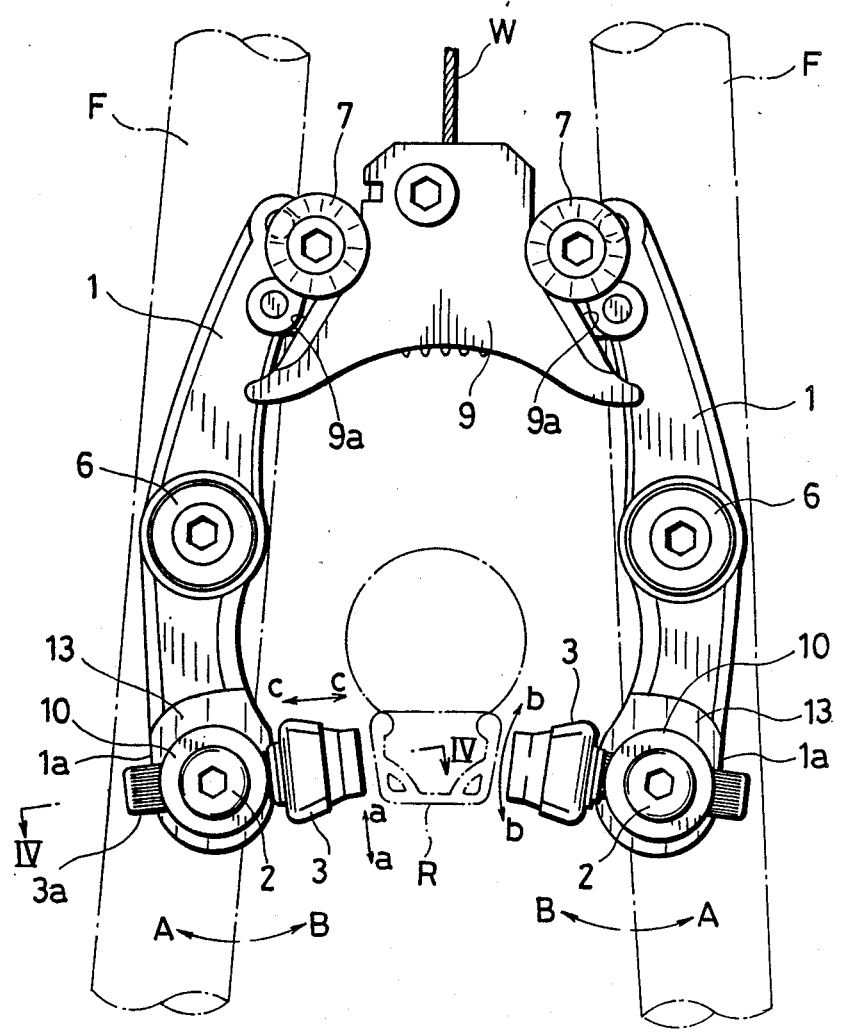
FIG. 1 is a front view showing a bicycle caliper brake assembly each caliper of which is provided with a shoe mounting structure according to the present invention.
Figure 2:
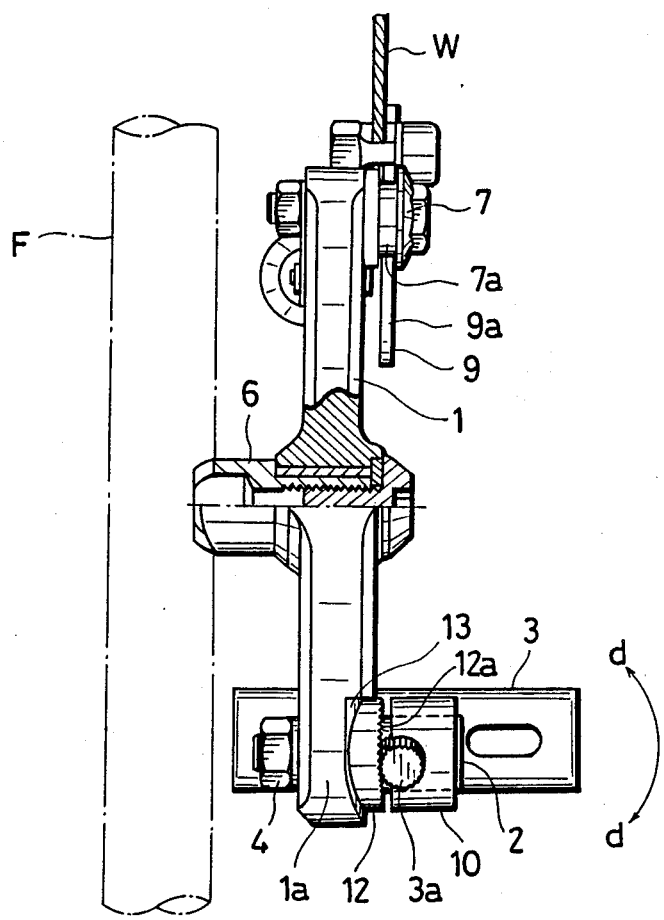
FIG. 2 is a side view, partly in section, of the same brake assembly.
Figure 3:
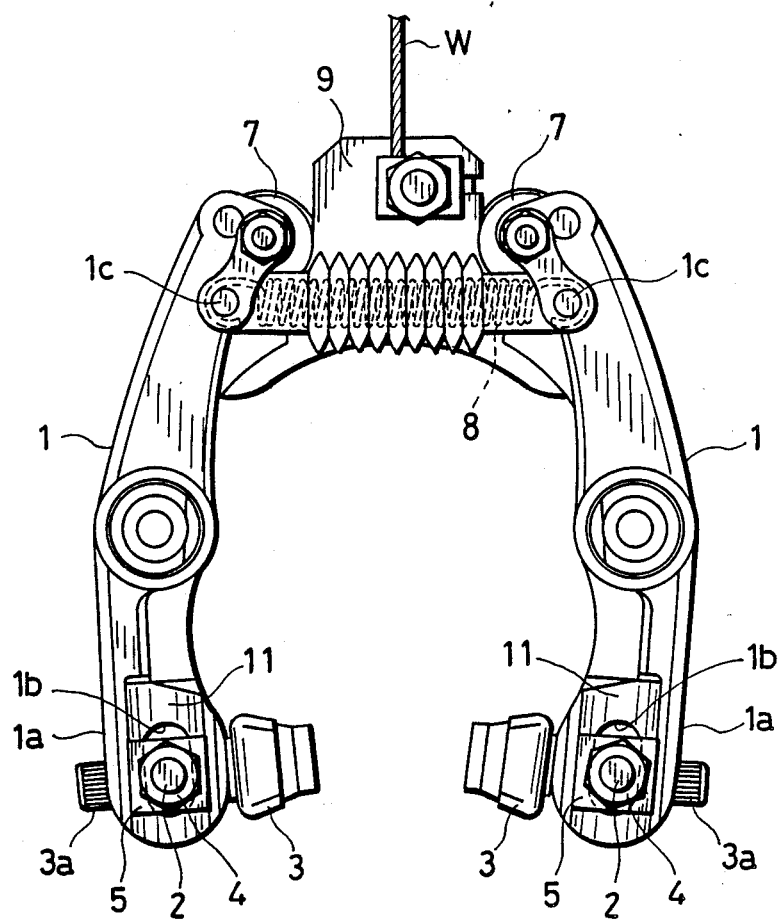
FIG. 3 is a rear view of the same brake assembly.

Referring now to FIGS. 1 to 3 of the accompanying drawings, there is illustrated a bicycle brake assembly which comprises a pair of brake arms 1 pivotally mounted on the bicycle frame. According to the illustrated example, the brake assembly is a cam-operated caliper brake assembly. However, the present invention may be applied to various types of brake assemblies such as side-pull type caliper brake, center-pull type caliper brake, and cantilever type brake.

The pair of brake arms or calipers 1 are arranged on both sides of a bicycle wheel rim R as pivotally supported at their respective intermediate portions on separate support shafts 6. Each of the support shaft 6 is fixed to a corresponding fork blade F of a front or rear fork.

Each caliper 1 has a shoe support portion 1a at its lower end for carrying a brake shoe 3 in facing relation to a corresponding side of the wheel rim R. The caliper is further provided at its upper end with a roller 7 having a circumferential groove 7a (see FIG. 2).

As shown in FIG. 3, the upper ends of the respective calipers 1 are further provided with engaging pins 1c and connected together by means of a tension coil spring 8 engaging with the respective pins 1c. Thus, the two calipers are always urged in the brake releasing direction, so that the respective brake shoes 3 are normally kept away from the wheel rim R. The two calipers can be operated for braking by an operating cam plate 9 connected to a control cable W which in turn is connected to a remote brake lever (not shown).

The cam plate 9, which is generally triangular, is disposed between the rollers or cam followers 7 of the respective calipers 1. Specifically, the cam plate has a pair of oppositely inclined cam edges 9a for engagement with the circumferential grooves 7a of the cam followers, as better illustrated in FIG. 2. Because the cam plate is held at the adjusted position shown in FIG. 1 in the non-braking condition, the calipers are prevented from pivoting excessively in the brake releasing direction.

When the unillustrated remote brake lever is operated to pull up the control cable W, the cam plate 9 is raised to increase the distance between the cam follower rollers 7, so that the calipers 1 are pivoted in the braking direction against the urging force of the tension spring 8 (FIG. 3), as indicated by arrows B in FIG. 1. As a result, the respective brake shoes 3 come into braking contact with the wheel rim R.

On the other hand, when the remote brake control lever is freed, the cam plate 9 is lowered to allow the cam followers 7 to move toward each other under the biasing force of the tension spring 8 (FIG. 3). As a result, the calipers 1 are pivoted in the brake releasing direction to bring the respective shoes 3 away from the wheel rim R, as indicated by arrows A in FIG. 1.

The specific arrangement of the brake assembly described above is known and does not constitute the feature of the present invention. The feature of the invention resides in the mounting structure for the respective brake shoes 3, particularly an improvement in such a mounting structure, as described below.

Similarly to the conventional arrangement, each brake shoe 3 has a mounting pin 3a which extends laterally of the bicycle. This pin is used for adjustably mounting the shoe.

Figure 4:
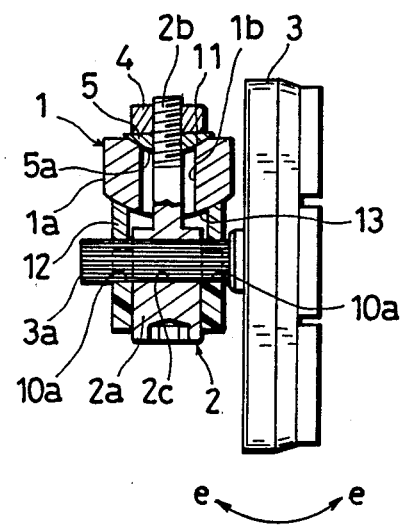
FIG. 4 is a sectional plan view taken on lines IV—IV in FIG. 1 to show the details of the shoe mounting structure.
Figure 5:
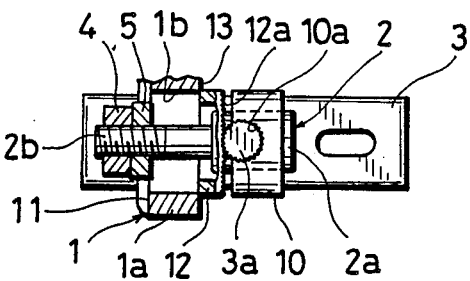
FIG. 5 is a sectional side view showing the same shoe mounting structure.
Figure 6:
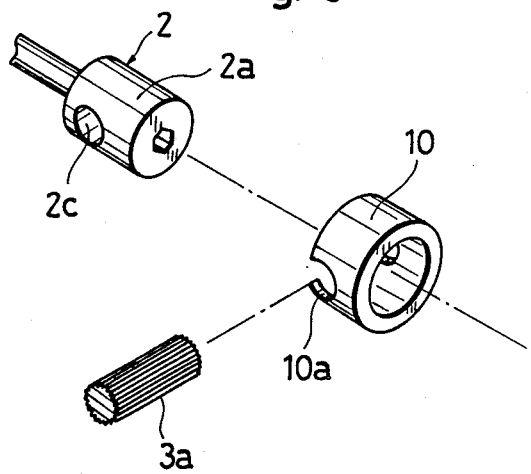
FIG. 6 is a perspective exploded view showing the same shoe mounting structure.

As shown in FIGS. 4 to 6, the mounting pin 3a of the brake shoe 3 is adjustably fixed to the shoe support portion 1a of a corresponding brake caliper 1 mainly by means of a support bolt 2 which extends lengthwise of the bicycle. The shoe support portion of the caliper is formed with a bolt reception bore 1b which extends lengthwise of the bicycle. Preferably, the bolt reception bore 1b is elongated vertically in cross-section to enable vertical movement of the support bolt 2, as shown in FIGS. 3 and 5.

The support bolt 2 has an enlarged cylindrical head 2a and a threaded shank 2b. The cylindrical head 2a is formed with a cross bore 2c extending diametrically of the head for receiving the mounting pin 3a of the brake shoe 3. In assembly, the cylindrical head is located in front of the shoe support portion 1a of the brake caliper 1, whereas the threaded shank 2b penetrates through the bolt reception bore 1b to partially project behind the shoe support portion, as illustrated in FIGS. 4 and 5.

A nut 4 is screwed to the projecting threaded shank 2b of the support bolt 2. Preferably, a slidable washer 5 is interposed between the nut and the shoe support portion 1a of the caliper 1. The slidable washer 5 has an arcuately convex surface 5a, while the rear surface of the shoe support portion 1a is formed with a generally vertical groove 11 which is arcuately concave in cross-section for coming into intimate contact with the convex surface 5a of the washer, as best shown in FIG. 4 (see also FIGS. 3 and 5).

According to the illustrated example, a slidable spacer ring 12 is interposed between the mounting pin 3a of the brake shoe 3 and the shoe support portion 1a of the caliper 1, as shown in FIGS. 4 and 5. Preferably, the shoe support portion 1a has a front surface 13 which is arcuately convex in cross-section, and the spacer 12 is designed to come into intimate contact with the convex front surface of the shoe support portion.

When the nut 4 is tightened up, the enlarged head 2a of the support bolt 2 is pulled toward the shoe support portion 1a of the caliper 1. However, the mounting pin 3a of the brake shoe 3 comes into contact with the spacer 12 and thereby prevented from moving further toward the shoe support portion 1a. As a result, the mounting pin 3a is strongly pressed transversely against the cross bore, thereby fixing the shoe 3 relative to the support bolt 2 which in turn is fixed relative to the shoe support portion 1a.

When the nut 4 is loosened, on the other hand, the mounting pin 3a of the brake shoe 3 becomes loose relative to the support bolt 2 which in turn becomes loose relative to the shoe support portion 1a of the caliper 1. In this loose condition, the brake shoe may be adjusted variously in its mounting position or orientation, as follows:

(1) Vertical adjustment by raising or lowering the support bolt 2 or the bolt shank 2b relative to the bolt reception bore 1b which is elongated vertically (see FIGS. 3 and 5), as indicated by an doubled headed arrow a—a in FIG. 1. Such adjustment is possible because the washer 5 and the spacer 12 are slidable vertically along the concave groove 11 and convex front surface 13, respectively, of the caliper shoe support portion 1a.

(2) Rotational or orientation adjustment by rotating the support bolt 2 about its own longitudinal axis, as indicated by an double headed arrow b—b in FIG. 1.

(3) Horizontal adjustment by slidably moving the mounting pin 3a relative to the cross bore 2c of the support bolt 2, as indicated by an double headed arrow c—c in FIG. 1.

(4) Second rotational or orientation adjustment by rotating the mounting pin 3a about its own axis, as indicated by an double headed arrow d—d in FIG. 2.

(5) Third rotational or orientation adjustment by pivoting the support bolt 2 about an axis (substantially vertical axis) which is perpendicular to the support bolt 2 and the mounting pin 3a, as indicated by a double headed arrow e—e in FIG. 4. This third rotational adjustment is possible because the rear and front surfaces 11, 13 of the caliper shoe support portion 1a are arcuate, and because the bolt reception bore 1b has a width larger than the diameter of the support bolt 2.

Thus, according to the illustrated example, the brake shoe 3 has five degrees of freedom for adjustment. However, the brake shoe may have less or more degrees of adjusting freedom. For example, the bolt reception bore 1b of the caliper shoe support portion 1a may have a width substantially equal to the diameter of the bolt shank 2b, with the result that the brake shoe 3 will have four degrees of adjusting freedom, i.e., only (1) to (4) above.

Obviously, the adjusting freedom, in many degrees, of the brake shoe 3 will enable wide and fine adjustment in position and orientation thereof to suit various types of bicycles or various riding conditions, thereby providing effective or wanted braking performance. On the other hand, such diversity in adjustability of the brake shoe will sometimes lead to adjusting difficulty if no measure is taken for simplifying the adjusting operation.

More specifically, when the nut 4 is loosened for adjustment of the brake shoe 3, both of the support bolt 2 and the shoe mounting pin 3a become loose to such an extent that they may move freely without positive or intentional adjusting action thereto. Thus, even if one needs only vertical adjustment, the brake shoe may unexpectedly move horizontally or rotationally during such vertical adjustment, consequently failing to conduct intended adjustment. In an extreme case, one may have to readjust the shoe position or orientation in all other directions of adjusting freedom from the very beginning in addition to one or more particular adjusting directions actually requiring adjustment.

The present invention seeks to facilitate the adjusting operation of the brake shoe without reducing diversity or versatility of adjustment.

According to the illustrated embodiment, a cylindrical pin retainer 10 is fitted on the enlarged head 2a of the support bolt 2, as shown in FIGS. 4 and 5. This pin retainer functions to restrain the shoe mounting pin 3a from unexpectedly moving relative to the cross bore 2c of the support bolt 2 even after the nut 4 is loosened for adjustment.

The pin retainer 10, which is preferably made of a resin, is formed with a diametrically opposite pair of pin retaining holes 10a which are slightly smaller in diameter than the shoe mounting pin 3a. In assembly, the pin retainer 10 is fitted onto the bolt enlarged head 2a to bring the pair of pin retaining holes 10a into alignment with the bolt cross bore 2c, and the shoe mounting pin 3a is inserted into the bolt cross bore and the pin retaining holes. Due to the slight diametrical difference described above, the shoe mounting pin 3a comes into press-fitting engagement with the pin retaining holes 10a with a sufficient friction which restrains the shoe mounting pin from unexpectedly sliding and rotating relative to the bolt cross bore 2c even after the nut 4 is loosened.

Preferably, each of the pin retaining holes 10a is partially cut away to open radially toward the caliper shoe support portion 1a, as shown in FIGS. 4 to 6. In this way, it is ensured that the shoe mounting pin 3a comes into direct contact with the slidable spacer 12 to enable firm fixation of the shoe 3 when the nut 4 is tightened up.

Further, the mounting pin 3a of the brake shoe 3 preferably has a cylindrical surface which is minutely serrated or knurled, while the slidable spacer 12 has a rear surface 12a which is formed with radially extending serrations for engagement with the knurled mounting pin, as shown in FIG. 5. Such an arrangement provides even stronger fixation of the brake shoe 3 when the nut 4 is tightened up.

With the arrangement described above, the pin retainer 10 always restrains the movement of the shoe mounting pin 3a relative to the support bolt 2 even after loosening of the nut 4. In other words, the position or orientation of the shoe 3 relative to the support bolt 2 will not change as long as the shoe mounting pin 3a is not forcibly moved relative to the pin retainer 10 against the friction between the shoe mounting pin and the pin retaining holes 10a. Thus, it is possible to adjust only the vertical position, for example, of the shoe 3 without positively or intentionally holding the relative position or orientation between the support bolt 2 and the shoe mounting pin 3a, thereby greatly facilitating the adjusting operation.

On the other hand, the pin retainer 10 provides the pin holding function only by friction. Thus, it is still possible to slide or rotate the shoe mounting pin 3a relative to the bolt cross bore 2c by manually applying a force enough to overcome the pin holding friction. In this way, the diversity in the freedom of adjustment can still be enjoyed.

According to the illustrated embodiment, both holes 10a of the pin retainer 10 come into press-fitting engagement with the shoe mounting pin 3a. However, it suffices to use only one of these holes for press-fitting engagement with the shoe mounting pin, the other hole allowing loose passage therethrough of the mounting pin. Alternatively, the pin retainer may be modified to have only one hole which comes into press-fitting engagement with the mounting pin.

Further, each pin retaining hole 10a of the pin retainer 10 may be completely circular. In this case, the pin retainer may be made to have an outer diameter which is smaller than the inner diameter of the spacer ring 12, so that the pin retainer can advance into the spacer to enable the shoe mounting pin 3a to come direct contact with the spacer when the nut 4 is tightened up for fixation.

Moreover, the slidable spacer 12 may be dispensed with. In this case, the shoe support portion 1a of each caliper 1 may be modified to have an integral projecting portion to come into direct contact with the shoe mounting pin 3a when the nut 4 is tightened up. Instead, the pin retainer 10 may be modified to come into direct contact with the caliper shoe support portion 1a.

Apparently, the pin retainer 10 may be made of any suitable material other than a resinous material. Further, the shape of the pin retainer is optional.

The present invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

I claim:
1. An adjustable shoe mounting structure for a bicycle brake assembly comprising:
   a bolt reception bore penetrating through a shoe support portion of the brake assembly;
   a support bolt loosely insertable into said reception bore, one end of said support bolt being threaded and projectable from one end of said reception bore, the other end of said support bolt being projectable from the other end of said reception bore and formed with a cross bore extending transversely of said support bolt;
   a shoe mounting pin extending from a brake shoe for insertion into said cross bore of said support bolt;
   a nut engageable with said threaded end of said support bolt for transversely pressing said shoe mounting pin against said cross bore of said support bolt upon tightening of said nut to fix said brake shoe relative to said shoe support portion; and
   a pin retainer mounted to said other end of said support bolt and having at least one pin retaining hole in alignment with said cross bore for press-fitting to said shoe mounting pin to frictionally restrain said shoe mounting pin from moving relative to said cross bore.
2. The shoe mounting structure as defined in claim 1, wherein said pin retainer has a pair of pin retaining holes in alignment with said cross bore of said support bolt for press-fitting to said shoe mounting pin.
3. The shoe mounting structure as defined in claim 1, wherein said pin retaining hole is partially cut way to open radially toward said shoe support portion.
4. The shoe mounting structure as defined in claim 1, wherein said other end of said support bolt is in the form of an enlarged cylindrical head, said pin retainer being cylindrical for closely fitting on said cylindrical head.
5. The shoe mounting structure as defined in claim 1, further comprising a spacer interposed between said shoe support portion and said shoe mounting pin for coming into pressing contact therewith when said nut is tightened up.
6. The shoe mounting structure as defined in claim 1, wherein said shoe mounting pin has a knurled cylindrical surface.
7. The shoe mounting structure as defined in claim 5, wherein said shoe mounting pin has a knurled cylindrical surface, said spacer having a serrated surface for engagement with said knurled cylindrical surface of said mounting pin.
8. The shoe mounting structure as defined in claim 1, wherein said pin retainer is made of a resin.
9. The shoe mounting structure as defined in claim 1, wherein said bolt reception bore of said shoe support portion is elongated in cross-section perpendicularly to said shoe mounting pin.
10. The shoe mounting structure as defined in claim 1, further comprising a slidable washer interposed between said shoe support portion and said nut, and a slidable spacer interposed between said shoe support portion and said shoe mounting pin.

11. The shoe mounting structure as defined in claim 10, wherein said shoe support portion is formed with an arcuately concave groove for contact with said slidable washer which has an arcuately convex surface, said shoe support portion being further formed with an arcuately convex guide surface for contact with said slidable spacer which is correspondingly concave, said bolt reception bore having a width larger than the diameter of a shank of said support bolt.

* * * * *